US011115562B2

(12) United States Patent
Zhang et al.

(10) Patent No.: US 11,115,562 B2
(45) Date of Patent: Sep. 7, 2021

(54) CONTEXT-AWARE IMAGE PROCESSING

(71) Applicant: Synaptics Incorporated, San Jose, CA (US)

(72) Inventors: Jun Zhang, Santa Clara, CA (US); Chang Qing Zhang, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 53 days.

(21) Appl. No.: 16/533,264

(22) Filed: Aug. 6, 2019

(65) Prior Publication Data
US 2021/0044722 A1    Feb. 11, 2021

(51) Int. Cl.
*H04N 1/00* (2006.01)
*H04N 1/60* (2006.01)
*G06T 7/90* (2017.01)
*G06T 3/40* (2006.01)

(52) U.S. Cl.
CPC ............ *H04N 1/6002* (2013.01); *G06T 3/40* (2013.01); *G06T 7/90* (2017.01); *G06T 2207/10024* (2013.01)

(58) Field of Classification Search
CPC ........... H04N 1/6002; G06T 7/90; G06T 3/40; G06T 2207/10024
See application file for complete search history.

(56) References Cited

U.S. PATENT DOCUMENTS

| 6,121,978 | A | * | 9/2000 | Miler | G09G 5/391 |
|---|---|---|---|---|---|
| | | | | | 345/629 |
| 2010/0066762 | A1 | * | 3/2010 | Yeh | H04N 5/44591 |
| | | | | | 345/629 |
| 2011/0235944 | A1 | * | 9/2011 | Ernst | G06T 3/4007 |
| | | | | | 382/299 |

* cited by examiner

*Primary Examiner* — Ping Y Hsieh
*Assistant Examiner* — Xiao Liu
(74) *Attorney, Agent, or Firm* — Paradice & Li LLP

(57) ABSTRACT

A method and apparatus for image processing. An image scaling circuit is configured to receive image data for a plurality of pixels corresponding to a first image. The image data includes color information and a transparency value for each of the plurality of pixels. The image scaling circuit updates the image data by selectively changing the color information for one or more of the pixels based at least in part on the transparency values. In updating the image data, the image scaling circuit may determine contextual information about the first image based at least in part on the transparency values. The image scaling circuit further generates an interpolated image based on the updated image data for the plurality of pixels. For example, the interpolated image may be a scaled version of the first image.

20 Claims, 11 Drawing Sheets

CONTEXT-AWARE IMAGE PROCESSING

TECHNICAL FIELD

The present embodiments relate generally to image processing.

BACKGROUND OF RELATED ART

Image processing enables a captured image to be rendered on a display such that the original image can be reproduced as accurately as possible given the capabilities (or limitations) of the display technology. For example, a high definition (HD) display device with a 2,000-pixel horizontal resolution may be unable to reproduce a full-resolution image captured in an ultra-high definition (UHD) format (e.g., with a 4,000-pixel horizontal resolution). Thus, image processing may reduce the number of pixels in the original image so that it can be rendered on an HD display. The process of converting an image from its native resolution to a higher or lower resolution is often referred to as image scaling.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for image processing is disclosed. One innovative aspect of the subject matter of this disclosure can be implemented in method of image processing. In some embodiments, the method may include steps of receiving image data for a plurality of pixels corresponding to a first image, where the image data includes color information and a transparency value for each of the plurality of pixels; updating the image data by selectively changing the color information for one or more of the pixels based at least in part on the transparency values; and generating an interpolated image based on the updated image data. For example, the interpolated image may be a scaled version of the first image. In updating the image data, the method may further include a step of determining contextual information about the first image based at least in part on the transparency values.

Another innovative aspect of the subject matter of this disclosure can be implemented in an image processing system. In some embodiments, the image processing system may include encoding circuitry and scaling circuitry. The encoding circuitry receives first image data from a first image source and further receives second image data from a second image source. The encoding circuitry is configured to generate third image data based on the first image data and the second image data, where the third image data includes color information and a transparency value for each of a plurality of pixels corresponding to a third image. The scaling circuitry is configured to update the third image data by selectively changing the color information for one or more of the pixels based, at least in part, on the transparency values. The scaling circuitry further generates an interpolated image based on the updated third image data.

BRIEF DESCRIPTION OF THE DRAWINGS

The present embodiments are illustrated by way of example and are not intended to be limited by the figures of the accompanying drawings.

DETAILED DESCRIPTION

Figure 1:
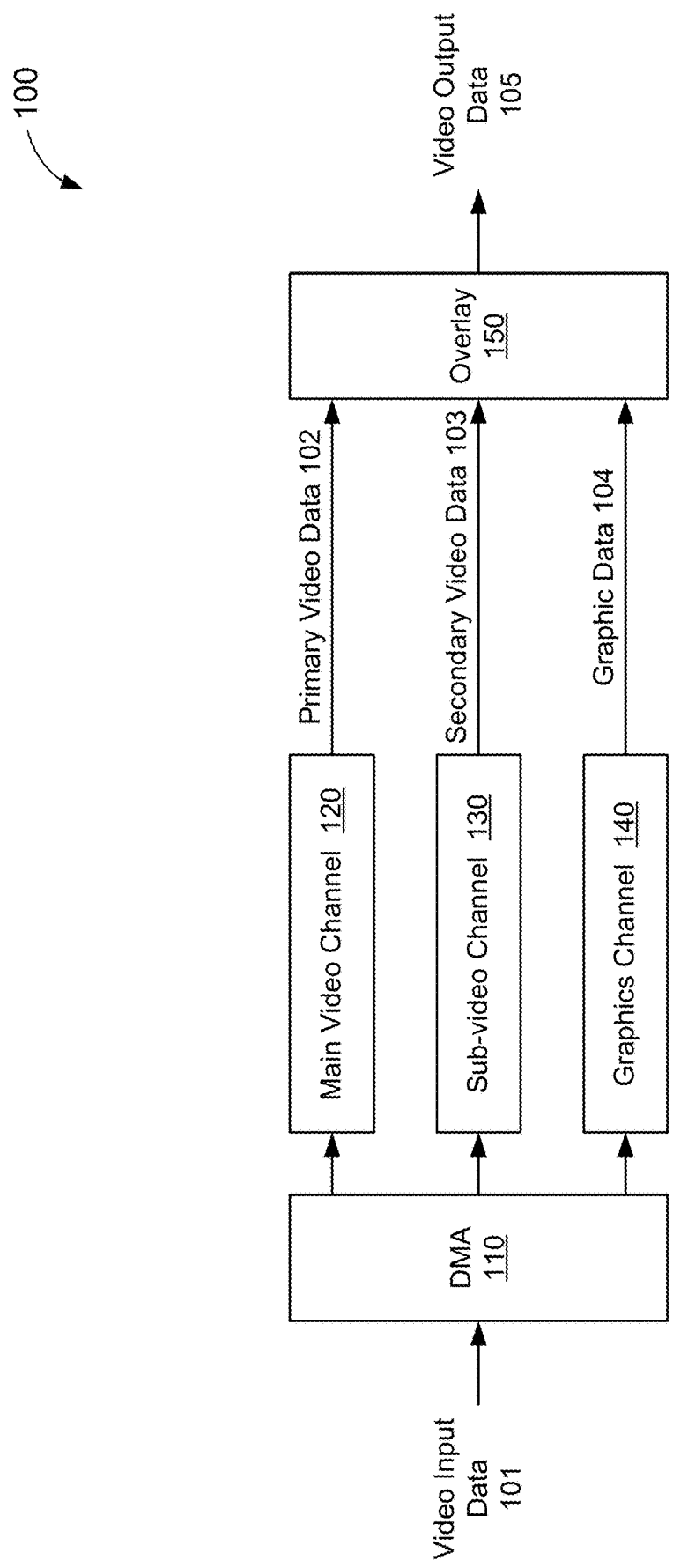
FIG. 1 shows a block diagram of an example video post-processing (VPP) pipeline configured to transfer images from different image capture devices to a display device.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically-erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

Aspects of the present disclosure are directed to a system and method of context-aware image scaling. Image scaling is often used to convert a digital image from its native resolution to fit the resolution of a display device. The resulting image is a scaled (e.g., upscaled or downscaled) version of the original image. Because the scaled image will have fewer or more pixels than the original image, the pixel values of the scaled image must be interpolated from the pixel values of the original image. The interpolation often results in visual artifacts (e.g., blurring, fading, ringing, etc.) around the edges of objects in the scaled image. Context-aware interpolation (CAI) is a technique for reducing such visual artifacts, for example, by first determining a context of the objects in the images and then using the contextual information to fine-tune the interpolation at the edges or boundaries of the objects. The present embodiments provide a fast and inexpensive approach to CAI which can be performed without the step of context detection. In some embodiments, an image scaler may leverage pixel transparency information for a received image in determining how to interpolate the pixel values.

FIG. 1 shows a block diagram of an example video post-processing (VPP) pipeline 100 that configured to transfer images from different image capture devices to a display device. The VPP pipeline 100 includes a direct media access (DMA) controller 110, a main video channel 120, a sub-video channel 130, a graphics channel 140, and an overlay module 150. The VPP pipeline 100 may receive one or more incoming video signals from an image capture device, such as a camera or video recorder, and process the received video signals for presentation on a display device.

The DMA 110 may receive video input data 101 from various sources (e.g., image capture devices) and redistribute the video input data 101 to one or more of the channels 120-140. For example, if the video input data 101 corresponds to a primary video feed (e.g., from a first source device), the DMA 110 may forward the video input data 101 to the main video channel 120. If the video input data 101 corresponds to a secondary video feed (e.g., from a second source device), the DMA 110 may forward the video input data 101 to the sub-video channel 130. If the video input data 101 corresponds to a graphic (e.g., from a third source device), the DMA 110 may forward the video input data 101 to the graphics channel 140.

The main video channel 120 processes the video input data 101 to generate primary video data 102 for display on a corresponding display device. The primary video data 102 may correspond to a primary video feed to be presented prominently on the display device, for example, by occupying most (if not all) of the display area. Accordingly, the main video channel 120 may perform the greatest amount of post-processing on the video input data 101 (e.g., more than the sub-video channel 130 and the graphics channel 140) to ensure that the primary video data 102 can be reproduced as accurately as possible, with minimal noise and/or artifacts.

The sub-video channel 130 processes the video input data 101 to generate secondary video data 103 for display on the corresponding display device. The secondary video data 103 may correspond to a secondary video feed to be presented, concurrently with the primary video feed, in a relatively small display region (e.g., in a picture-in-picture or "PIP" format) of the display device. Since the secondary video feed may occupy a substantially smaller display region than the primary video feed, the sub-video channel 130 may perform less post-processing than the main video channel 120 (e.g., but more post-processing than the graphics channel 140) in generating the secondary video data 103.

The graphics channel 140 processes the video input data 101 to generate graphic data 104 for display on the corresponding display device. The graphic data 104 may correspond to one or more graphics to be presented, concurrently with the primary video feed and/or the secondary video feed, in a portion of the display device (e.g., as a HUD or overlay). Since the graphics may not contain detailed image or video content, the graphics channel 140 may perform the least amount of post-processing (e.g., less than the main video channel 120 and the sub-video channel 130) in generating the graphic data 104.

The overlay module 150 may combine the primary video data 102 with at least one of the secondary video data 103 and/or the graphic data 104 to produce video output data 105 corresponding to a combined video feed that is optimized for display on the display device. For example, each frame of the combined video feed may include a single frame of the primary video feed and a single frame of the secondary video feed and/or a graphic to be displayed with the frame of the primary video feed. In some implementations, the overlay module 150 may render the secondary video data 103 and/or the graphic data 104 for display as an overlay that covers at least a portion of the primary video feed 102. Thus, when the display device renders the video output data 105, at least some of the pixels will display a portion of the primary video feed and at least some of the pixels will display the secondary video feed and/or the graphic overlay.

Figure 2:
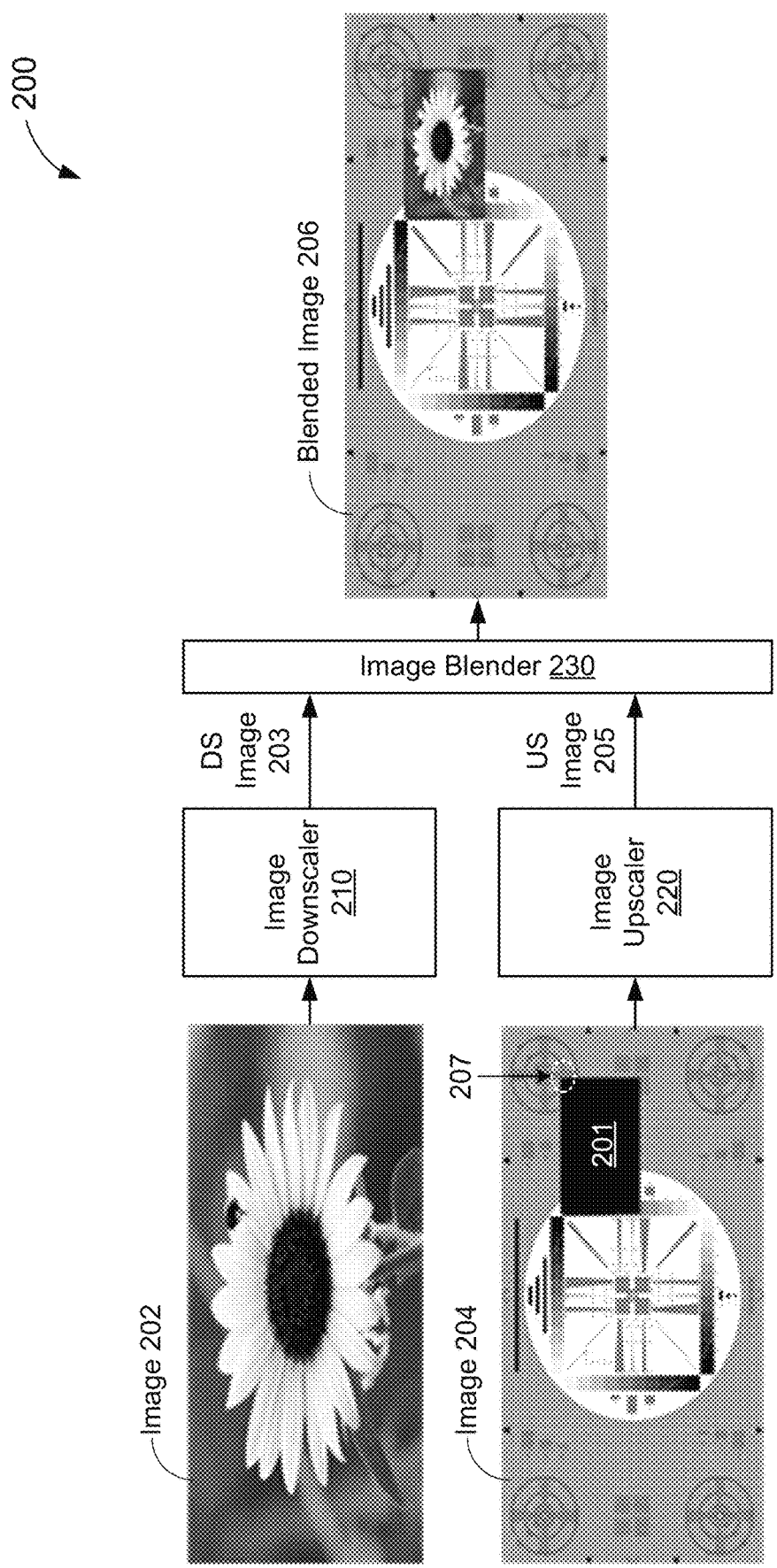
FIG. 2 shows an example image processing system in which the present embodiments may be implemented.

FIG. 2 shows an example image processing system 200 in which the present embodiments may be implemented. The system 200 includes an image downscaler 210, an image upscaler 220, and an image blender 230. The image processing system 200 may be one embodiment of at least a portion of the overlay module 150 of FIG. 1. More specifically, the image processing system 200 may be configured to combine multiple images 202 and 204 into a single blended image 206 to be displayed on a display device. In some aspects, one or more of the images 202, 204, and/or 206 may correspond to a frame of video to played back on the display device.

The image downscaler 210 is configured to receive the first image 202 and generate a corresponding downscaled (DS) image 203. In the embodiment of FIG. 2, the first image 202 may correspond to a secondary video feed to be presented, concurrently with a primary video feed, in a relatively small display region (such as a PIP window) of the display device. However, the resolution of the PIP window may be substantially lower than the native resolution of the first image 202. Thus, the first image 202 may need to be resized (e.g., downscaled) to fit the PIP window. The downscaled image 203 may include fewer pixels than the first image 202. In some embodiments, the image downscaler 210 may interpolate the pixel values for the downscaled image 203 from the pixel values of the first image 202. Example suitable downscaling interpolation techniques may include, but are not limited to, nearest-neighbor interpolation, bilinear interpolation, bicubic interpolation, and the like.

The image upscaler 220 is configured to receive the second image 204 and generate a corresponding upscaled (US) image 205. In the embodiment of FIG. 2, the second image 204 may correspond to the primary video feed to be presented prominently on the display device, for example, by occupying most (if not all) of the display area. However, the overall resolution of the display device may be substantially larger than the native resolution of the second image 204. Thus, the second image 204 may need to be resized (e.g., upscaled) to the fill resolution of the display device. The upscaled image 205 may include more pixels than the second image 204. In some embodiments, the image upscaler 220 may interpolate the pixel values for the upscaled image 205 from the pixel values of the second image 204. Example suitable upscaling interpolation techniques may include, but are not limited to, nearest-neighbor interpolation, bilinear interpolation, bicubic interpolation, and the like.

The image blender 230 combines (e.g., blends) the scaled images 203 and 205 to generate the blended image 206. In the embodiment of FIG. 2, the upscaled image 205 is the prominent feature of the blended image 206. In other words, the vast majority of the pixels in the blended image 206 are copied from the upscaled image 205. In contrast, the downscaled image 203 is presented as an overlay (e.g., in a PIP window) in the upper right-hand portion of the blended image 206. Thus, only a small subset of the pixels in the blended image 206 are copied from the downscaled image 203. In generating the blended image 206, the image blender 230 may replace or substitute a small subset of pixels (e.g., in the PIP window) of the upscaled image 205 with the pixel values of the downscaled image 203.

The second image 204 includes a framed region 201 which corresponds to the PIP window in the blended image 206. In the embodiment of FIG. 2, the framed region 201 is depicted as a black rectangle with a different color border. The framed region 201 may be generated by a graphics generator, rather than an image capture device, and integrated with the second image 204 prior to upscaling. With reference for example to FIG. 1, the graphic data 104 may include the pixel values for the framed region 201 and the primary video data 102 may include the pixel values for the remainder of the image 204. Prior to combining the primary video data 102 with the secondary video data 103, the overlay module 150 may first merge the graphic data 104 with the primary video data 102 to produce the second image 204 with the framed region 201.

After upscaling, the black rectangle on the inside of the framed region 201 (e.g., of the upscaled image 205) may have substantially the same resolution as the downscaled image 203. Thus, the image blender 230 may substitute the black pixels inside the framed region 201 with the corresponding pixel values of the scaled image 203. In some implementations, the border around the framed region 201 may be maintained in the blended image 206, for example, to delineate the secondary video feed from the primary video feed. However, without context awareness each pixel value of the upscaled image 205 would be directly interpolated from a predetermined number (N) of pixel values of the second image 204. This may lead to visual artifacts (e.g., blurring, fading, ringing, etc.) around the edges or boundaries of the border.

Figure 3A:
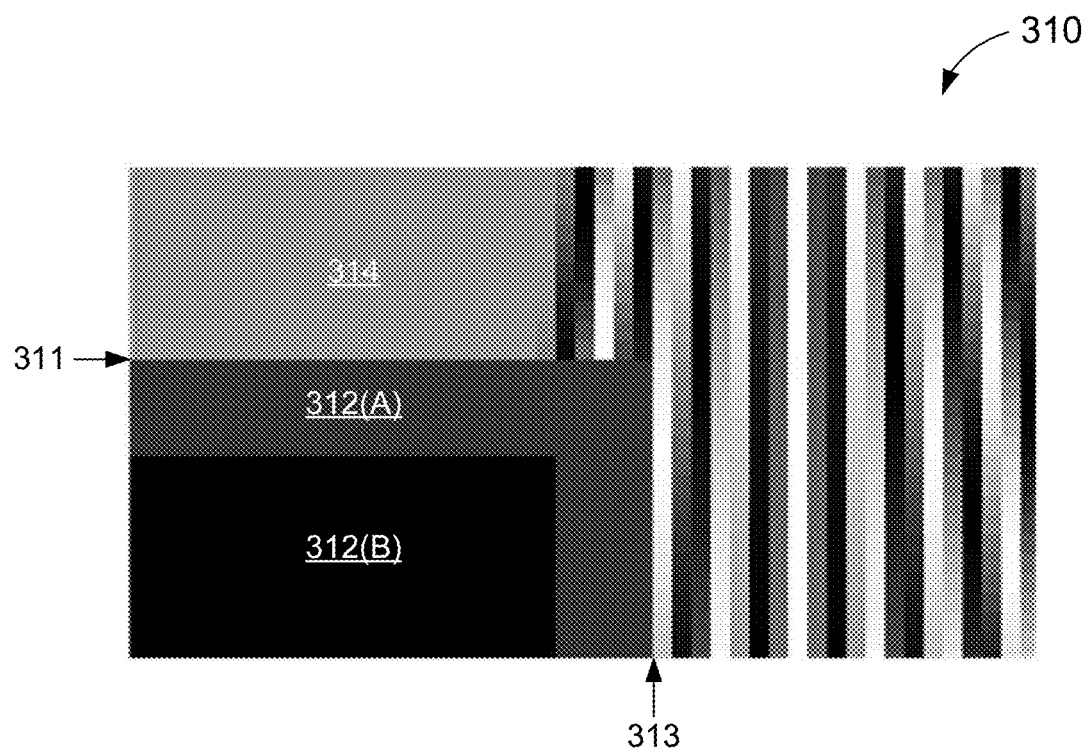
FIGS. 3A and 3B show example portions of an image before and after scaling.

FIG. 3A shows an example portion of an image 310 prior to scaling. The image portion 310 includes a border 312(A) which delineates or separates a first region of the image 312(B) from a second region of the image 314. With reference for example to FIG. 2, the image portion 310 may be a close-up view of a portion 207 of the second image 204 (e.g., the region circled by the dotted line). More specifically, the border 312(A) may correspond to the border around the framed region 201 of FIG. 2. Thus, the first region of the image 312(B) may correspond to the black rectangle of the framed region 201 and the second region of the image 314 may correspond to the underlying image 204. As shown in FIG. 3A, the border 312(A) has sharp, clean edges 311 and 313 where the border 312(A) intersects the second region of the image 314.

Figure 3B:
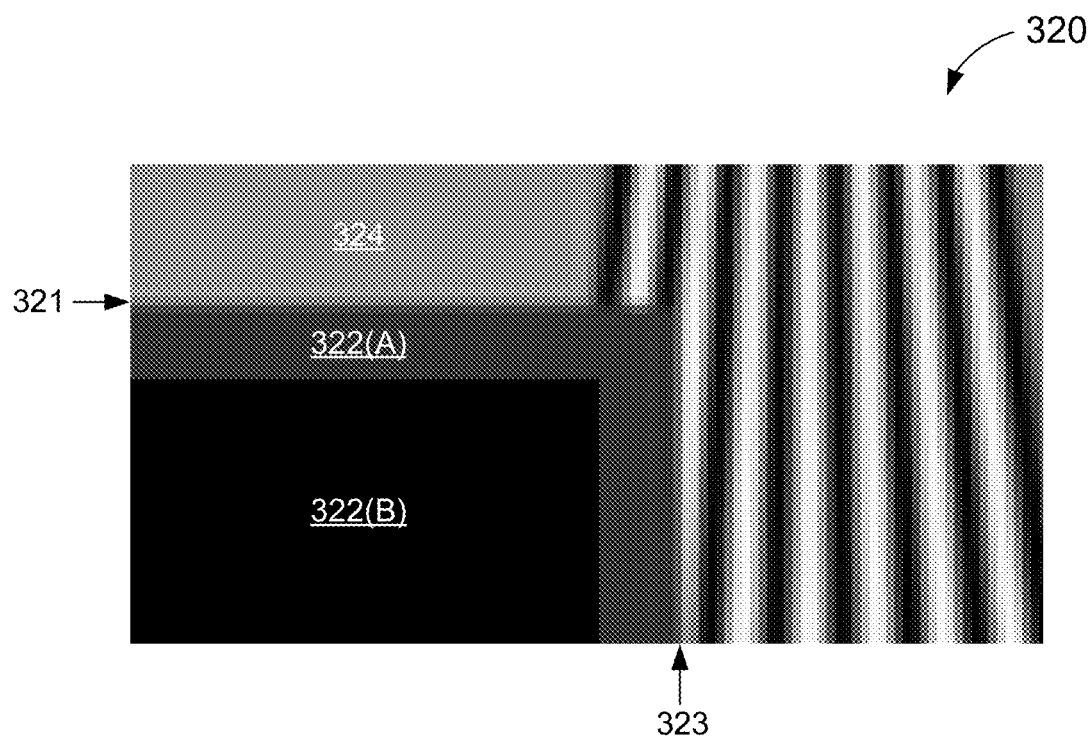

FIG. 3B shows an example portion of an image 320 after scaling. The image portion 320 includes a border 322(A) which delineates or separates a first region of the image 322(B) from a second region of the image 324. The image portion 320 may be an upscaled version of the image portion 310, shown in FIG. 3A, when the upscaling is performed without context awareness. More specifically, the border 322(A) may correspond to the border 312(A) of FIG. 3A after upscaling. In contrast with the border 312(A), the border 322(A) has blurry edges 321 and 323 where the border 322(A) intersects the second region of the image 324. The edges 321 and 323 also exhibit phantom colors that are not found in any of the surrounding pixels of the original image 310, prior to upscaling. This is known as a "ringing" effect.

The artifacts (e.g., blurring and ringing) along the edges 321 and 323 may be caused by pixel interpolation during the upscaling process. Because the upscaled image 320 includes a greater number of pixels than the original image 310, many (if not all) of the pixel values for the upscaled image 320 (e.g., "upscaled pixels") must be created or generated by an image upscaler (such as the image upscaler 220). More specifically, when generating the upscaled pixels, the image upscaler may approximate the pixel values based on the neighboring pixels in the original image 310 (e.g., "original pixels"). For example, the image upscaler may determine the pixel value for an upscaled pixel based on a weighted average of the pixel values for a number (N) of adjacent original pixels. At the borders or edges of objects in the upscaled image 320, each upscaled pixel value is derived, at least in part, from the pixel values of adjoining objects and/or features. This results in the blurring and/or ringing effects exhibited by the edges 321 and 323.

Context-aware interpolation (CAI) is a technique for reducing such visual artifacts by first determining a context of the objects in the images and then using the contextual information to fine-tune the interpolation at the edges or boundaries of the objects. Example CAI techniques include temporal interpolation and spatial interpolation. Temporal interpolation involves detecting the motion of objects across multiple images or video frames and determining object boundaries in each image based on the detected motion. Spatial interpolation involves detecting the edges of objects in each image or video frame and determining object boundaries based on the detected edges. In contrast to temporal and spatial interpolation techniques, the present embodiments may perform CAI techniques without an additional step of detecting the context of objects before interpolation can be performed. Since no additional processing is needed to derive such contextual information, the CAI techniques disclosed herein may be cheaper and simpler to implement.

Aspects of the present disclosure recognize that some contextual information may be included in raw image data. For example, the raw image data for a given pixel may include color information (e.g., red, green, and blue component values) and a transparency value ($\alpha$). The transparency value may be an 8-bit value specifying the transparency (or opacity) of the given pixel. While small differences in transparency value (such as between 254 and 255) may be virtually indistinguishable to the human eye, any differences in transparency values can be readily identified by image processing hardware. Accordingly, in some embodiments, image scaling circuitry (such as the image downscaler 210 and/or the image upscaler 220) may leverage the transparency values included in received image data to perform context-aware interpolation. More specifically, the image scaling circuitry may extract contextual information from raw image data without the need for further processing or analysis. Among other advantages, the present embodiments provide a low-cost, low-complexity CAI solution that can be used to reduce artifacts in image scaling.

Figure 4:
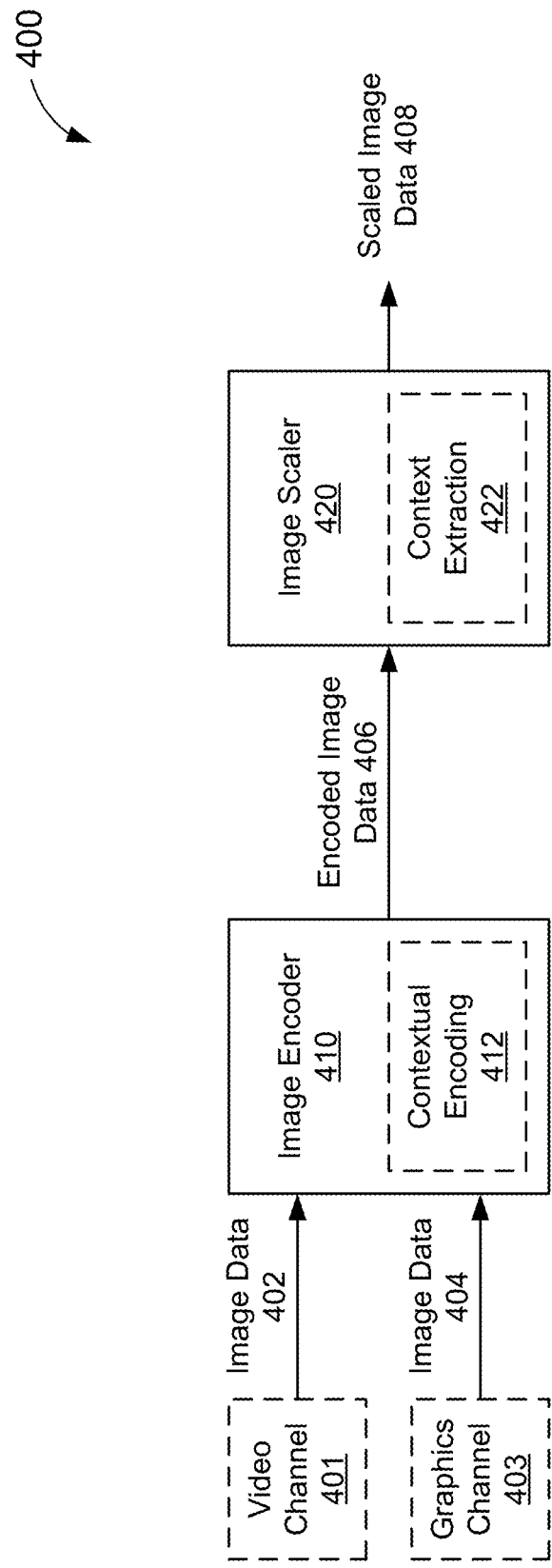
FIG. 4 shows a block diagram of an image processing system, in accordance with some embodiments.

FIG. 4 shows a block diagram of an image processing system 400, in accordance with some embodiments. The system 400 includes an image encoder 410 and an image scaler 420. The image processing system 400 may be one embodiment of at least a portion of the overlay module 150 of FIG. 1. More specifically, the image processing system 400 may be configured to generate a scaled image for display on a display device. In some aspects, the scaled image may be generated by combining image data from multiple image sources.

The image encoder 410 is configured to receive image data 402 and 404 from multiple sources and generate encoded image data 406 by combining the received image data 402 and 404. In some aspects, the first image data 402 may be received from a video channel 401 and the second image data 404 may be received from a graphics channel 403. With reference for example to FIG. 1, the video channel 401 may correspond to the main video channel 120 or the sub-video channel 130 and the graphics channel 403 may correspond to the graphics channel 140. Thus, the second image data 404 may correspond to a graphic to be embedded in the first image data 402. With reference for example to FIG. 2, the encoded image data 406 may include the pixel values for the second image 204. Moreover, the second image data 404 may include the pixel values for the framed region 201 (e.g., the PIP window) and the first image data 402 may include the pixel values for the remaining pixels of the second image 204.

The image encoder 410 may generate the encoded image data 406 by replacing or substituting a subset of pixel values in the first image data 402 with the pixel values of the second image data 404. As shown in FIG. 4, the image encoder 410 receives the first image data 402 and the second image data 404 from different sources. Aspects of the present disclosure recognize that the different image sources may provide context for the image data 402 and 404. For example, because the second image data 404 is received via the graphics channel 403, the image encoder 410 may recognize that the second image data 404 describes a permanent object or fixture in the encoded image (e.g., the second image 204). In some embodiments, the image encoder 410 may encode contextual information into the encoded image data 406. For example, in generating the encoded image data 406, the image encoder 410 may encode the pixel values derived from the first image data 402 differently than the pixel values derived from the second image data 404.

In some embodiments, the contextual information may be encoded using the transparency values associated with each pixel. More specifically, the transparency values associated with the first image data 402 may differ from the transparency values associated with the second image data 404 by at least a threshold amount. For example, assuming the encoded image data 406 is to be rendered as an opaque image, pixel values derived from the first image data 402 may have a transparency value of 255 while pixel values derived from the second image data 404 may have a transparency value of 254. Aspects of the present disclosure recognize that, while such a small difference in the transparency value may be virtually indistinguishable to the human eye, the difference may readily distinguish the context of the first image data 402 from the second image data 404 to an image processor.

In some aspects, the image encoder 410 may include a contextual encoding module 412 to generate the contextual information for the encoded image data 406. For example, the contextual encoding module 412 may encode the first image data 402 differently than the second image data 404 based on the different image sources from which they are received. In some embodiments, the contextual encoding module 412 may adjust or modify the transparency values for the first image data 402 and/or the second image data 404 to ensure that the transparency values for the first image data 402 differ from the transparency values for the second image data 404 by at least a threshold amount. For example, if the first image data 402 and the second image data 404 are received with transparency values of 255, the contextual encoding module 412 may lower the transparency values for the second image data 404 (e.g., to 254 or below) when encoding the pixels of the second image data 404 in the encoded image data 406.

In some other aspects, the contextual information may be generated by the image source itself. For example, the second image data 404 may be generated locally by a graphics generator residing on the image processing platform (not shown for simplicity). To provide context for the second image data 404, the graphics generator may generate the second image data 404 differently than it would otherwise generate such image data to achieve the desired output. In some embodiments, the graphics generator may select the transparency values for the second image data 404 to be sufficiently different than the transparency values for the first image data 402 by at least a threshold amount. For example, if the second image data 402 is to be rendered as an opaque image or graphic on the display device, the graphics generator may use slightly lower transparency values when generating the second image data 404 (e.g., 254 or lower) than would otherwise be used to achieve opacity (e.g., 255).

The image scaler 420 receives the encoded image data 406 from the image encoder 410 and generates scaled image data 408. The image scaler 420 may be one embodiment of the image downscaler 210 or the image upscaler 220 of FIG. 2. Thus, the image scaler 420 may scale the encoded image data 406 to a different (higher or lower) resolution, for example, to match the resolution of the display device. More specifically, the image scaler 420 may scale the encoded image data 406 using context-aware interpolation techniques. In some embodiments, the image scaler 420 may include a context extraction module 422 to extract contextual information embedded in the encoded image data 406 rather than determining such contextual information through additional processing and/or analysis. The image scaler 420 may then use the contextual information to interpolate the pixel values for the scaled image data 408, for example, to produce smooth and/or sharp edges at object boundaries in the scaled image.

In some aspects, the context extraction module 422 may determine the context of one or more objects in the encoded image data 406 based, at least in part, on the transparency values for each pixel of the encoded image data 406. As described above, the transparency values for pixels derived from the first image data 402 may differ from the transparency values for pixels derived from the second image data 404 by at least a threshold amount. The differences in transparency values may be interpreted as contextual information by the context extraction module 422. More specifically, the context extraction module 422 may use the differences in transparency values to identify object boundaries in the encoded image data 406. The image scaler 420 may then fine-tune the pixel interpolation at the object boundaries to prevent cross-contamination of pixel data from either side of the object boundaries.

With reference for example to FIG. 2, the context extraction module 422 may detect the boundary of the framed region 210 within the second image 204 based on the transparency value of each pixel in the second image 204. For example, the transparency values for the pixels within the framed region 210 may differ from the transparency values for the remaining pixels of the second image 204 by at least a threshold amount. When upscaling the second image 204 (e.g., to produce the upscaled image 205), the image scaler 420 may ensure that the pixel values along the boundary or edges of the PIP window in the upscaled image 205 are interpolated entirely from the pixel values within the framed region 210 or the pixel values outside the framed region 210 of the original image 204 (but not both). This may reduce artifacts that would otherwise be created around edges of the PIP window in the upscaled image 205 (e.g., without context awareness).

Figure 5:
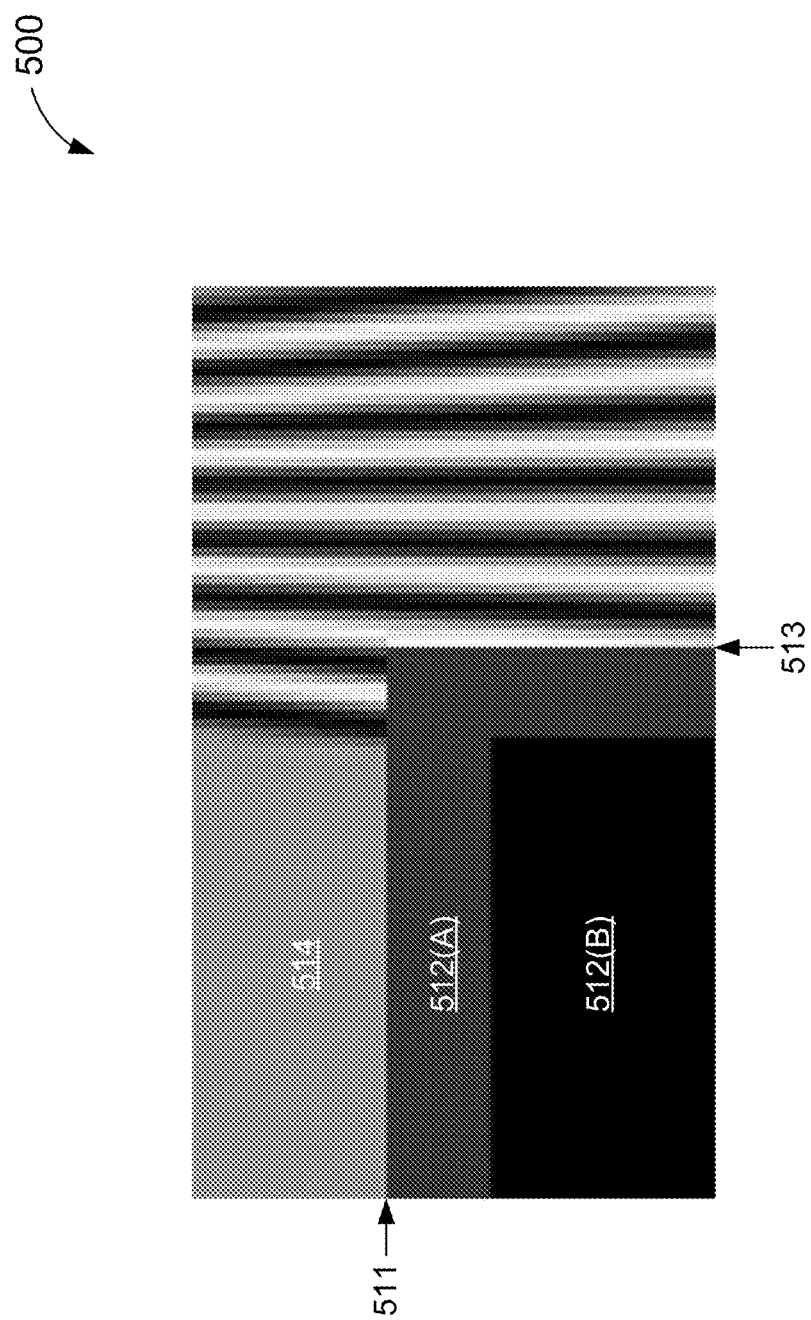
FIG. 5 shows an example portion of a scaled image using context-aware interpolation.

FIG. 5 shows an example portion of a scaled image 500 using context-aware interpolation. The image portion 500 includes a border 512(A) which delineates or separates a first region of the image 512(B) from a second region of the image 514. With reference for example to FIG. 3A, the image portion 500 may be one embodiment of the image portion 310 after upscaling with CAI. For example, the image scaler 420 of FIG. 4 may upscale the image portion 310 to the image portion 500. Thus, the border 512(A), the first region of the image 512(B), and the second region of the image 514 of FIG. 5 may correspond to the border 312(A), the first region of the image 312(B), and the second region of the image 314, respectively, of FIG. 3A. As shown in FIG. 5, the border 512(A) has sharp, clean edges 511 and 513 where the border 512(A) intersects the second region of the image 514. In contrast with FIG. 3B, the edges 511 and 513 of the image portion 500 do not exhibit any of the artifacts shown in the edges 321 and 323 of the image portion 320.

Aspects of the present disclosure further recognize that the encoded image data 406 may be used to provide context awareness to other image processing operations in addition to, or in lieu of, image scaling. For example, image processing may also be used to reduce the color, brightness, and/or contrast of a high dynamic range (HDR) image to be rendered on a standard dynamic range (SDR) display. Given the limitations of an SDR display, contextual information about graphics and/or objects in the HDR image may be helpful in determining how to accurately reproduce the image on the SDR display. For example, image graphics may have different HDR and/or SDR display characteristics than other components of the image. Thus, in some embodiments, the transparency values in the encoded image data 406 may be used as contextual information when converting an image from an HDR domain to an SDR domain, and vice-versa.

Figure 6:
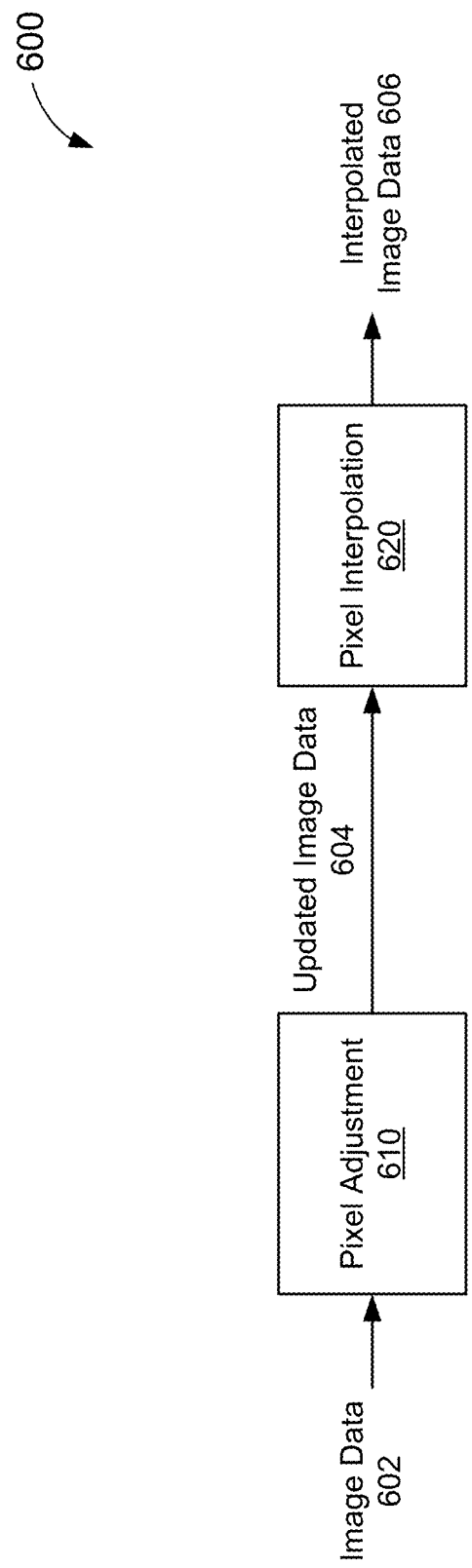
FIG. 6 shows a block diagram of an image scaling circuit, in accordance with some embodiments.

FIG. 6 shows a block diagram of an image scaling circuit 600, in accordance with some embodiments. The image scaling circuit 600 includes a pixel adjustment module 610 and a pixel interpolation module 620. The image scaling circuit 600 may be one embodiment of the image scaler 420 of FIG. 4. More specifically, the image scaling circuit 600 may be configured to convert received image data 602 to interpolated image data 606, where the interpolated image data 606 represents a scaled version of the received image data 602.

The pixel adjustment module 610 is configured to receive the image data 602 and generate updated image data 604 by selectively changing the pixel values for one or more pixels of the received image data 602. In some embodiments, the pixel adjustment module 610 may selectively change the color information for one or more pixels of the received image data 602 based, at least in part, on the transparency values for the pixels. For example, the transparency values may provide context for one or more objects in the received image data 602. As described with respect to FIGS. 4 and 5, the edges of an object may be identified by a change in transparency values (e.g., beyond a threshold amount) between pixels associated with the object and pixels outside the object. To prevent or reduce artifacts along the edges of objects in the scaled image, only the color information associated with the object in the original image may be used to interpolate color information for the object in the scaled image.

In some embodiments, the pixel adjustment module 610 may change the color information for one or more pixels neighboring the edges of an object for purposes of interpolation. For example, if a pixel value of the scaled image is to be interpolated from a number (n) of pixels inside the boundary of an object and a number (m) of pixels outside the boundary of the object in the original image, the pixel adjustment module 610 may change the color information for the m pixels in the updated image data 604. In some aspects, the pixel adjustment module 610 may change the color information for each of the m pixels to match the color information for one or more of the n pixels located within the boundary of the object. For example, the pixel adjustment module 610 may change the color information for each of the m pixels to the color information of the pixel in the original image that is closest to the position of the corresponding pixel in the scaled image.

The pixel interpolation module 620 is configured to generate the interpolated image data 606 based on the updated image data 604. The interpolated image data 606 may include pixel values for one or more pixels of the scaled image. More specifically, the pixel interpolation module 620 may interpolate the color information for each pixel of the interpolated image data 606 from the color information for a number (N) of pixels of the updated image data 604 (e.g., N-tap interpolation). Example suitable pixel interpolation techniques may include, but are not limited to, nearest-neighbor interpolation, bilinear interpolation, bicubic interpolation, and the like. Thus, the color of each pixel of the interpolated image data 606 may depend on a weighted average of the colors for each of the N pixels of the updated image data 604.

Figure 7:
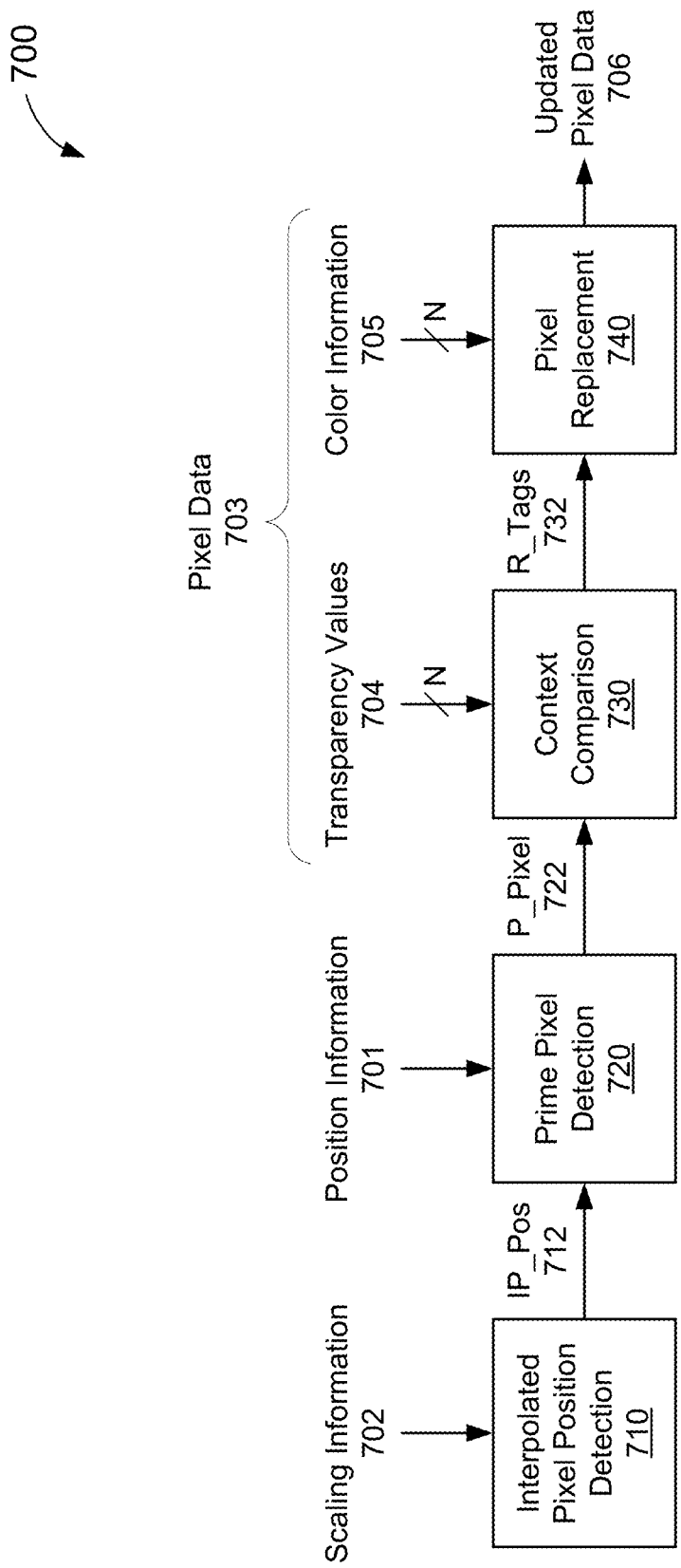
FIG. 7 shows a block diagram of a context-aware pixel adjustment circuit, in accordance with some embodiments.

FIG. 7 shows a block diagram of a context-aware pixel adjustment circuit 700, in accordance with some embodiments. The pixel adjustment circuit 700 includes an interpolated pixel position (IPP) detection module 710, a prime pixel detection module 720, a context comparison module 730, and a pixel replacement module 740. The context-aware pixel adjustment circuit 700 may be one embodiment of the pixel adjustment circuit 610 of FIG. 6. Thus, the pixel adjustment circuit 700 may generate updated pixel data 706 by selectively changing the pixel values for one or more pixels of received pixel data 703 based, at least in part, on contextual information. The updated pixel data 706 may be used to generate an interpolated pixel of a scaled image. More specifically, the interpolated pixel may be derived (e.g., interpolated) from a number (N) of pixels of the original image.

The IPP detection module 710 is configured to determine an interpolated pixel position (IP_Pos) 712 based, at least in part, on scaling information 701. The interpolated pixel position 712 may correspond to the location of the interpolated pixel in the scaled image. For example, the scaling information 701 may include a ratio and an initial phase of the scaling to be performed on the original image (e.g., to produce the scaled image). With reference for example to FIG. 6, the scaling information 701 also may be used by the pixel interpolation module 620 to generate the interpolated image data 606. Thus, in some embodiments, the IPP detection module 710 may use the scaling information 701 to predict or predetermine the location of an interpolated pixel that will be generated by the pixel interpolation module 620.

Figure 8A:
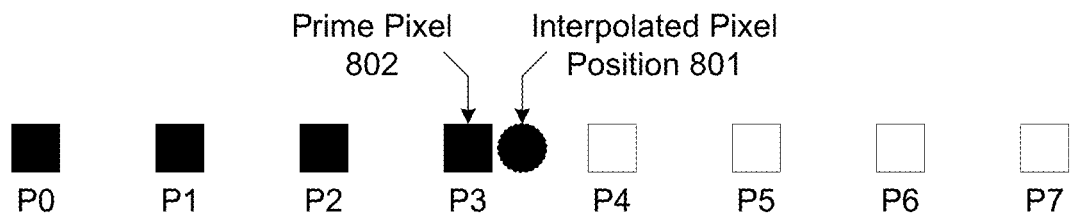
FIGS. 8A-8C show an example set of pixels from which an interpolated pixel may be derived.

The prime pixel detection module 720 is configured to select a prime pixel (P_Pixel) 722 among the N original pixels based, at least in part, on the interpolated pixel position 712 and position information 702 for each of the N original pixels. The position information 701 may indicate the relative locations of the N pixels from the original image. The prime pixel 722 may be a pixel in the original image that is closest in location to the interpolated pixel position 712. For example, FIG. 8A shows an example set of pixels P0-P7 from which an interpolated pixel may be derived. The position of the interpolated pixel 801 is depicted (in phantom) as a gray circle. In the embodiment of FIG. 8A, the interpolated pixel position 801 is located between pixels P3 and P4. However, the interpolated pixel position 801 is closer to the position of the black pixel P3 than the white pixel P4. Thus, pixel P3 may be selected as a prime pixel 802 by the prime pixel detection module 720.

Figure 8B:
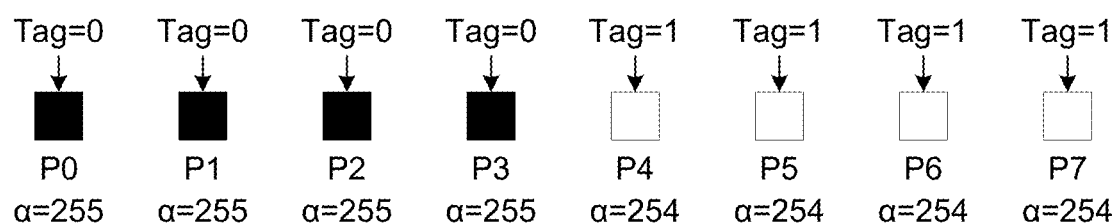

The context comparison module 730 is configured to generate replacement tags 732 for each of the N original pixels based, at least in part, on their respective transparency values 704. More specifically, the context comparison module 730 may compare the transparency value of the prime pixel 722 to the transparency values 704 for each of the remaining original pixels. In some embodiments, the context comparison module 730 may use the replacement tags 732 to flag any original pixels having a transparency value that differs from the transparency value of the prime pixel 722 by at least a threshold amount. With reference for example to FIG. 8B, it is shown that each of the black pixels P0-P3 has the same transparency value (e.g., α=255). More specifically, the first three pixels P0-P2 have the same transparency value as the prime pixel P3. In contrast, each of the white pixels P4-P7 has a transparency value (α=254) that differs from the transparency value of the prime pixel P3 by 1 bit. In the embodiment of FIG. 8B, a 1-bit difference is the threshold for receiving a replacement tag. Thus, the context comparison module 730 may generate a "null" tag (e.g., tag=0) for each of the black pixels P0-P3 and a "replace" tag (e.g., tag=1) for each of the white pixels P4-P7.

Figure 8C:
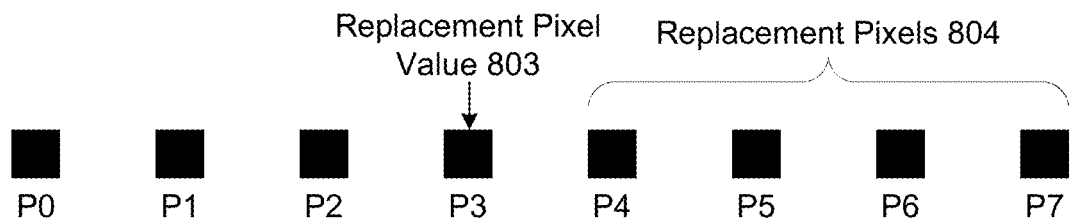

The pixel replacement module 740 is configured to generate the updated pixel data 706 by selectively changing the pixel values for one or more of the N original pixels based, at least in part, on the replacement tags 732. More specifically, the pixel replacement module 740 may change the pixel values for any of the N pixels tagged for replacement (e.g., flagged pixels). In some embodiments, the pixel replacement module 740 may replace the color information 705 of the flagged pixels with the color information for the prime pixel 722. With reference for example to FIG. 8C, the color information of the prime pixel P3 is identified as the replacement pixel value 803. Since each of the pixels P4-P7 had been tagged for replacement by the context comparison module 730, the pixel replacement module 740 may replace the color information of the pixels P4-P7 with the replacement pixel value 803. In the embodiment of FIG. 8C, the pixel replacement process results in each of the pixels P4-P7 changing from a white pixel to a black pixel (e.g., the color of the prime pixel P3).

The pixel adjustments performed by the context-aware pixel adjustment circuit 700 may affect the color of the interpolated pixels in the scaled image. For example, as shown in FIG. 8A, the four original pixels to the left of the interpolated pixel position 801 are black and the four original pixels to the right of the interpolated pixel position 801 are white. Thus, without any pixel adjustment, the color of the interpolated pixel at the interpolated pixel position 801 would have been a different color than any of the original pixels P0-P7 (e.g., a shade of gray) based on an 8-tap interpolation of the four black pixels P0-P3 and the four white pixels P4-P7. This may appear as ringing, blurring, and/or fading at the boundary between the black pixels and the white pixels in the scaled image. However, as shown in FIG. 8C, all eight of the updated pixels P0-P7 are black after the pixel adjustment. As a result, the color of the interpolated pixel at the interpolated pixel position 801 will also be black. Thus, the present embodiments may produce cleaner and/or sharper edges at the boundary between the black and white pixels in the scaled image.

Figure 9:
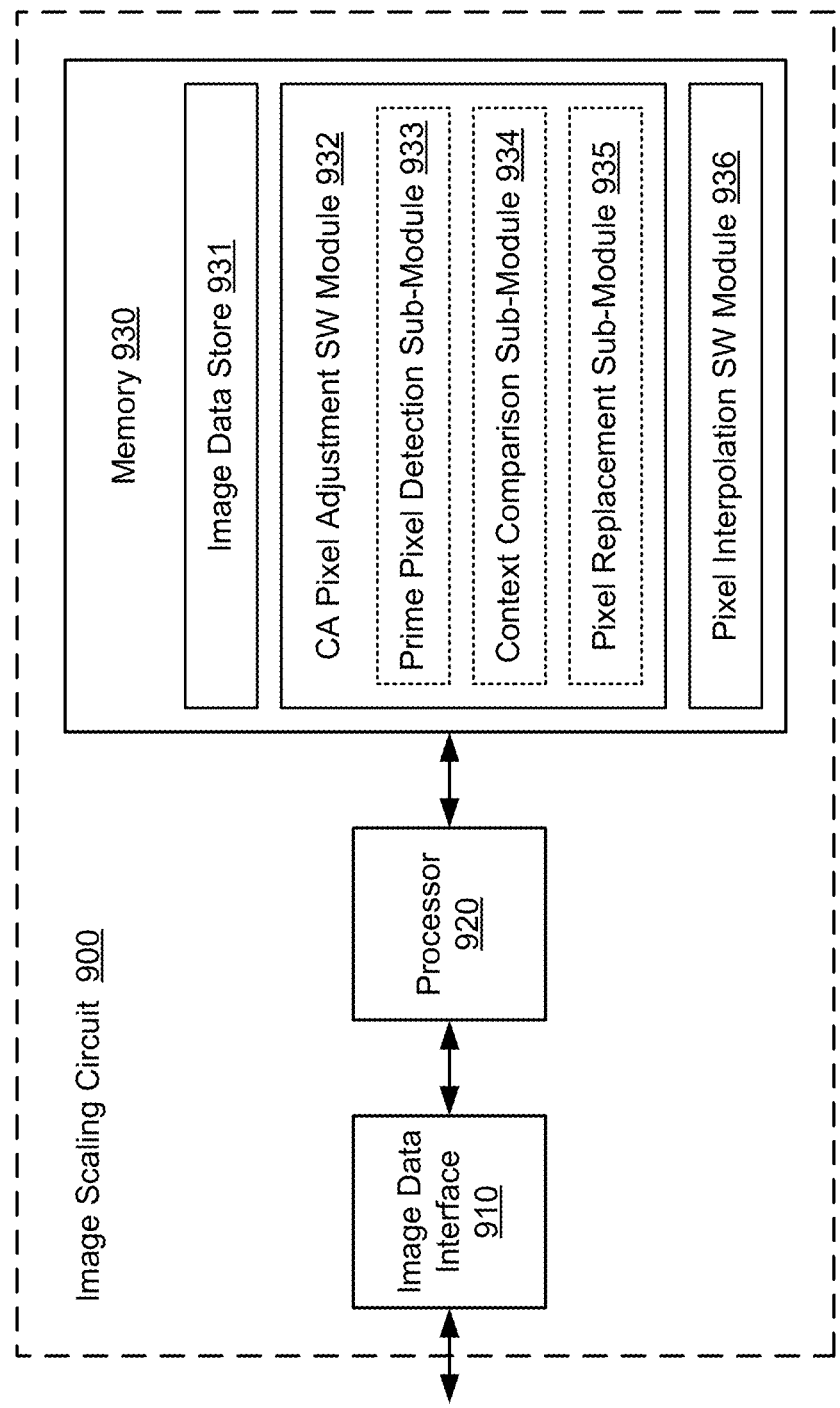
FIG. 9 shows another block diagram of an image scaling circuit, in accordance with some embodiments.

FIG. 9 shows another block diagram of an image scaling circuit 900, in accordance with some embodiments. The image scaling circuit 900 may be one embodiment of the image scaler 420 of FIG. 4 and/or the image scaling circuit 600 of FIG. 6. The image scaling circuit 900 includes an image data interface 910, a processor 920, and a memory 930.

The image data interface 910 may be used to communicate with one or more image sources and/or display devices coupled to the image scaling circuit 900. Example image sources may include, but are not limited to, image capture devices, graphics generators, image encoders, and/or other processing resources. Example display devices may include, but are not limited to, light emitting diode (LED), organic LED (OLED), cathode ray tube (CRT), liquid crystal display (LCD), plasma, and electroluminescence (EL) displays. In some embodiments, the image data interface 910 may be configured to receive original image data from one or more of the image sources and output a scaled version of the image data to one or more of the display devices.

The memory 930 may include an image data store 931 configured to store original image data received via the image data interface 910 and/or interpolated image data to be output via the image data interface 910. The memory 930 may also include a non-transitory computer-readable medium (e.g., one or more nonvolatile memory elements, such as EPROM, EEPROM, Flash memory, a hard drive, etc.) that may store at least the following software (SW) modules:

- a context-aware (CA) pixel adjustment SW module 932 to update the received image data by selectively changing the pixel values for one or more of the original pixels for purposes of interpolation, the CA pixel adjustment SW module 932 further including:
  - a prime pixel detection sub-module 933 to select a prime pixel among a number (N) of original pixels based, at least in part, on an interpolated pixel position associated with the N original pixels;
  - a context comparison sub-module 934 to generate replacement tags for each of the N original pixels based, at least in part, on the transparency value of the prime pixel and respective transparency values for each of the remaining original pixels; and
  - a pixel replacement sub-module 935 to selectively change the color information for one or more of the N original pixels based, at least in part, on the color information of the prime pixel and respective replacement tags for each of remaining original pixels; and
- a pixel interpolation SW module 936 to generate the interpolated image data based on the updated image data, for example, by interpolating each pixel value for the interpolated image data from N pixel values of the updated image data.

Each software module includes instructions that, when executed by the processor 920, cause the image scaling circuit 900 to perform the corresponding functions. The non-transitory computer-readable medium of memory 930 thus includes instructions for performing all or a portion of the operations described below with respect to FIGS. 10 and 11.

The processor 920 may be any suitable one or more processors capable of executing scripts or instructions of one or more software programs stored in the image scaling circuit 900. For example, the processor 920 may execute the CA pixel adjustment SW module 932 to generate updated image data for purposes of interpolation by selectively changing the pixel values for one or more original pixels of the received image data. The processor 920 may further execute the pixel interpolation SW module 936 to generate the interpolated image data based on the updated image data, for example, by interpolating each pixel value for the interpolated image data from N pixel values of the updated image data.

In executing the CA pixel adjustment SW module 932, the processor 920 may further execute the prime pixel detection sub-module 933, the context comparison sub-module 934, and/or the pixel replacement sub-module 935. For example, the processor 920 may execute the prime pixel detection sub-module 933 to select a prime pixel among a number (N) of original pixels based, at least in part, on an interpolated pixel position associated with the N original pixels. The processor 920 may further execute the context comparison sub-module 934 to generate replacement tags for each of the N original pixels based, at least in part, on the transparency value of the prime pixel and respective transparency values for each of the remaining original pixels. Still further, the processor 920 may execute the pixel replacement sub-module 935 to selectively change the color information for one or more of the N original pixels based, at least in part, on the color information of the prime pixel and respective replacement tags for each of remaining original pixels.

Figure 10:
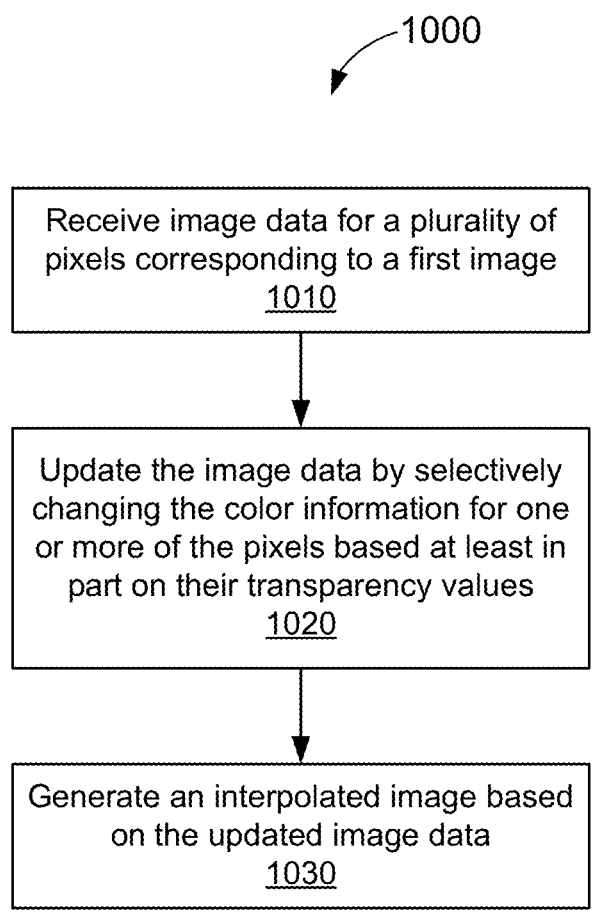
FIG. 10 is an illustrative flowchart depicting an example image processing operation, in accordance with some embodiments.

FIG. 10 is an illustrative flowchart depicting an example image processing operation 1000, in accordance with some embodiments. With reference for example to FIG. 6, the operation 1000 may be performed by the image scaling circuit 600 to convert received image data 602 to interpolated image data 606, where the interpolated image data 606 represents a scaled version of the received image data 602.

The image scaling circuit 600 may receive image data for a plurality of pixels corresponding to a first image (1010). For example, the first image may have a native resolution that is different than the resolution of the display area on which the image is to be rendered. Accordingly, the first image may need to be scaled (e.g., resized) to fit the resolution of the display. In some aspects, the first image may be upscaled to a higher resolution. In some other aspects, the first image may be downscaled to a lower resolution.

The image scaling circuit 600 may update the image data by selectively changing the color information for one or more of the pixels based at least in part on their transparency values (1020). For example, the transparency values may provide context for one or more objects in the received image data. As described with respect to FIGS. 4 and 5, the edges of an object may be identified by a change in transparency values (e.g., beyond a threshold amount) between pixels associated with the object and pixels outside the object. In some embodiments, the image scaling circuit 600 may change the color information for one or more pixels neighboring the edges of an object such that only color information associated with the object in the original image may be used to interpolate color information for the object in the scaled image.

Figure 11:
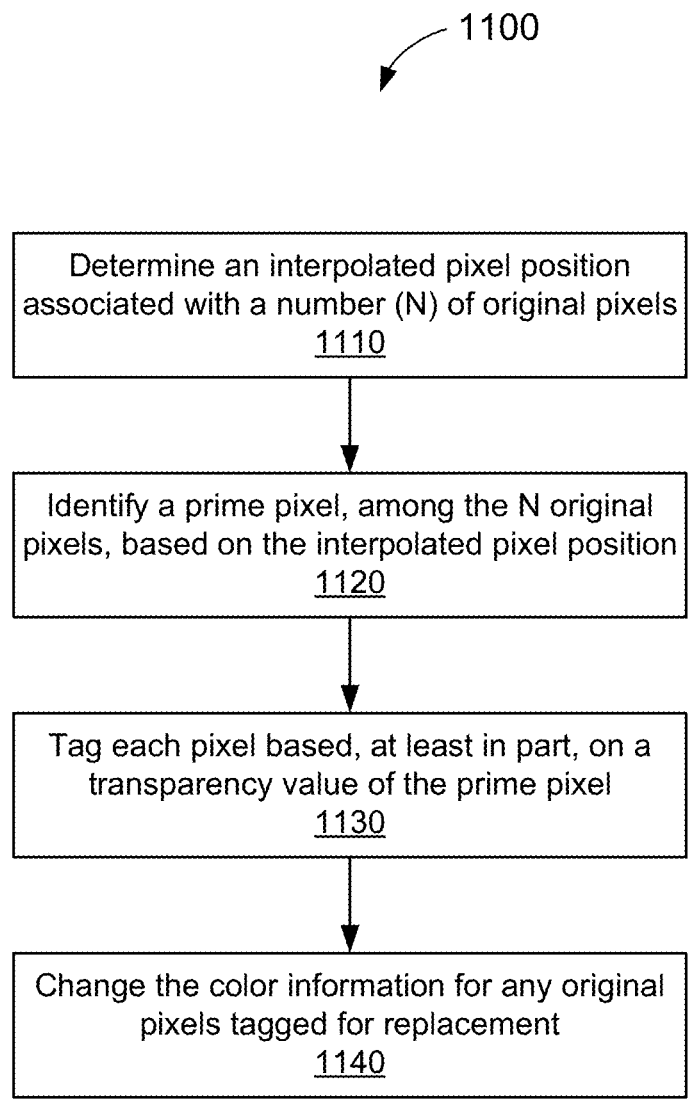
FIG. 11 is an illustrative flowchart depicting an example context-aware pixel adjustment operation, in accordance with some embodiments.

The image scaling circuit 600 may then generate an interpolated image based on the updated image data (1030). For example, the interpolated image may correspond to a scaled or resized version of the received image. In some embodiments, the image scaling circuit 600 may interpolate the color information for each pixel of the interpolated image from the color information for a number (N) of pixels associated with the updated image data (e.g., N-tap interpolation). Example suitable pixel interpolation techniques may include, but are not limited to, nearest-neighbor interpolation, bilinear interpolation, bicubic interpolation, and the like. Thus, the color of each pixel of the interpolated image may depend on a weighted average of the colors for each of the N pixels associated with the updated image data. As a result, the operation 1000 may prevent or reduce artifacts along the edges of objects in the scaled image FIG. 11 is an illustrative flowchart depicting an example context-aware pixel adjustment operation 1100, in accordance with some embodiments. With reference for example to FIG. 7, the operation 1100 may be performed by the context-aware pixel adjustment circuit 700 to selectively change the pixel values for one or more pixels of an original image for purposes of generating an interpolated pixel of a scaled image. More specifically, the interpolated pixel may be derived from a number (N) of pixels of the original image.

The pixel adjustment circuit 700 may determine an interpolated pixel position associated with the N original pixels (1110). The interpolated pixel position may correspond to the location of the interpolated pixel in the scaled image. In some embodiments, the pixel adjustment circuit 700 may determine the interpolated pixel position based, at least in part, on scaling information. For example, the scaling information may include a ratio and an initial phase of the scaling to be performed on the original image (e.g., to produce the scaled image).

The pixel adjustment circuit 700 may identify a prime pixel, among the N original pixels, based on the interpolated pixel position (1120). For example, the prime pixel may be a pixel in the original image that is closest in location to the interpolated pixel position. With reference for example to FIG. 8A, the interpolated pixel position 801 is located between pixels P3 and P4. However, the interpolated pixel position 801 is closer to the position of the black pixel P3 than the white pixel P4. Thus, the pixel adjustment circuit 700 may select the black pixel P3 as the prime pixel 802.

The pixel adjustment circuit 700 may further tag each pixel based, at least in part, on a transparency value of the prime pixel (1130). In some embodiments, the pixel adjustment circuit 700 may flag any original pixels having a transparency value that differs from the transparency value of the prime pixel by at least a threshold amount. With reference for example to FIG. 8B, each of the white pixels P4-P7 has a transparency value that differs from the transparency value of the prime pixel P3 by a threshold amount (e.g., 1 bit). Thus, the pixel adjustment circuit 700 may tag each of the white pixels P4-P7 for replacement (e.g., tag=1).

The pixel adjustment circuit 700 may then change the color information for any original pixels tagged for replacement (1140). In some embodiments, the pixel adjustment circuit 700 may replace the color information of the flagged pixels with the color information for the prime pixel. With reference for example to FIG. 8C, the color information of the prime pixel P3 is identified as the replacement pixel value 803. Since each of the pixels P4-P7 had been tagged for replacement, the pixel adjustment circuit 700 may replace the color information of the pixels P4-P7 with the replacement pixel value 803. As a result, the operation 1100 changes the color of each of the pixels P4-P7 from white to black for purposes of deriving the color of the interpolated pixel.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of image processing, comprising:
   receiving image data for a plurality of pixels corresponding to a first image, the image data including color information and a transparency value for each of the plurality of pixels;
   determining a boundary of the first image based on the transparency values, the boundary delineating a first region of the first image from a second region of the first image;
   updating the image data by selectively changing the color information for one or more of the pixels within the first region based at least in part on the color information for one or more of the pixels within the second region; and
   interpolating pixels within the second region based on the updated image data.

2. The method of claim 1, wherein the interpolated pixels represent a scaled version of the first image.

3. The method of claim 1, further comprising:
   determining contextual information about the first image based at least in part on the transparency values.

4. The method of claim 1, wherein the updating comprises:
   comparing the transparency value for a first pixel of the plurality of pixels with a target transparency value; and
   changing the color information of the first pixel when the transparency value for the first pixel differs from the target transparency value by at least a threshold amount.

5. The method of claim 4, further comprising:
   determining an interpolated pixel position based on a number of adjacent pixels of the plurality of pixels, the adjacent pixels including at least the first pixel; and
   selecting the target transparency value based at least in part on the interpolated pixel position, wherein the interpolated pixel position corresponds to a location of a pixel of the interpolated pixels.

6. The method of claim 5, wherein the selecting comprises:

identifying the adjacent pixel that is closest to the interpolated pixel position; and selecting the target transparency value based on the transparency value for the identified pixel.

7. The method of claim 6, wherein the changing comprises:

changing the color information of the first pixel to the color information of the identified pixel.

8. The method of claim 6, wherein the updating further comprises:

comparing the transparency value for each of the adjacent pixels to the transparency value for the identified pixel;

flagging any of the adjacent pixels having transparency values that differ from the transparency value of the identified pixel by at least the threshold amount; and changing the color information of the flagged adjacent pixels to the color information of the identified pixel.

9. The method of claim 8, wherein the interpolating comprises:

interpolating the pixel of the interpolated pixels using the color information for the adjacent pixels after the update.

10. An image scaling circuit, comprising:

a processing system; and a memory storing instructions that, when executed by the processing system, causes a graphics scaling circuit to:

receive image data for a plurality of pixels corresponding to a first image, the image data including color information and a transparency value for each of the plurality of pixels;

determine a boundary of the first image based on the transparency values, the boundary delineating a first region of the first image from a second region of the first image;

update the image data by selectively changing the color information for one or more of the pixels within the first region based at least in part on the color information for one or more of the pixels within the second region; and interpolate pixels within the second region based on the updated image data.

11. The image scaling circuit of claim 10, wherein execution of the instructions for updating the image data causes the graphics scaling circuit to:

compare the transparency value for a first pixel of the plurality of pixels with a target transparency value; and change the color information of the first pixel when the transparency value for the first pixel differs from the target transparency value by a threshold amount.

12. The image scaling circuit of claim 11, wherein execution of the instructions further causes the graphics scaling circuit to:

determine an interpolated pixel position based on a number of adjacent pixels of the plurality of pixels, the adjacent pixels including at least the first pixel; and select the target transparency value based at least in part on the interpolated pixel position, wherein the interpolated pixel position corresponds to a location of a pixel of the interpolated pixels.

13. The image scaling circuit of claim 12, wherein execution of the instructions for selecting the target transparency value causes the graphics scaling circuit to:

identify the adjacent pixel that is closest to the interpolated pixel position; and select the target transparency value based on the transparency value for the identified pixel.

14. The image scaling circuit of claim 13, wherein execution of the instructions for changing the color information of the first pixel causes the graphics scaling circuit to:

change the color information of the first pixel to the color information of the identified pixel.

15. The image scaling circuit of claim 13, wherein execution of the instructions for updating the image data further causes the graphics scaling circuit to:

compare the transparency value for each of the adjacent pixels to the transparency value for the identified pixel;

flag any of the adjacent pixels having transparency values that differ from the transparency value of the identified pixel by at least the threshold amount; and change the color information of the flagged adjacent pixels to the color information of the identified pixel.

16. The image scaling circuit of claim 12, wherein execution of the instructions for interpolating pixels within the second region causes the graphics scaling circuit to:

interpolate the color information for each of the adjacent pixels after the update.

17. An image processing system comprising:

encoding circuitry configured to:

receive first image data from a first image source;

receive second image data from a second image source; and generate third image data based on the first image data and the second image data, the third image data including color information and a transparency value for each of a plurality of pixels corresponding to a third image; and scaling circuitry configured to:

determine a boundary of the third image based on the transparency values, wherein the boundary delineates a first region of the third image from a second region of the third image, and wherein the first region corresponds to the first image data and the second region corresponds to the second image data;

update the third image data by selectively changing the color information for one or more of the pixels within the first region based at least in part on the color information for one or more of the pixels within the second region; and interpolating pixels within the second region based on the updated third image data.

18. The image processing system of claim 17, wherein a first subset of the pixels is derived from the first image data and a second subset of the pixels is derived from the second image data, and wherein the transparency values for the first subset of the pixels differs from the transparency values for the second subset of the pixels by at least a threshold amount.

19. The image processing system of claim 18, wherein the scaling circuitry is further configured to:

determine an interpolated pixel position based on a number of adjacent pixels of the plurality of pixels, wherein the interpolated pixel position corresponds to a location of a pixel of the interpolated pixels; and identify the adjacent pixel that is closest to the interpolated pixel position; and select a target transparency value based on the transparency value for the identified pixel.

20. The image processing system of claim 19, wherein the scaling circuitry is to update the image data by:

comparing the transparency value for each of the adjacent pixels to the transparency value for the identified pixel;

flagging any of the adjacent pixels having transparency values that differ from the transparency value of the identified pixel by at least the threshold amount; and
changing the color information of the flagged adjacent pixels to the color information of the identified pixel.

* * * * *